United States Patent [19]

Nakamura et al.

[11] Patent Number: 5,042,308
[45] Date of Patent: Aug. 27, 1991

[54] ELECTROSTATIC CAPACITANCE TYPE PRESSURE DETECTOR

[75] Inventors: Kimihiro Nakamura; Mikihiko Matsuda; Toshiyuki Takano; Mitsuru Tamai; Teizo Takahama, all of Kanagawa, Japan

[73] Assignee: Fuji Electric Co., Ltd., Kanagawa, Japan

[21] Appl. No.: 369,847

[22] Filed: Jun. 22, 1989

[30] Foreign Application Priority Data

| Jun. 23, 1988 | [JP] | Japan | 63-155578 |
| Jun. 23, 1988 | [JP] | Japan | 63-155579 |
| Nov. 29, 1988 | [JP] | Japan | 63-301978 |
| Nov. 29, 1988 | [JP] | Japan | 63-301979 |

[51] Int. Cl.$^5$ .............................. G01L 9/12; G01L 13/02
[52] U.S. Cl. .............................. 73/718; 73/708; 73/724; 361/283
[58] Field of Search .................... 73/718, 724, 708; 361/283

[56] References Cited

U.S. PATENT DOCUMENTS

| 2,999,386 | 9/1961 | Wolfe | 73/398 |
| 4,169,389 | 10/1979 | Yasuhara et al. | 73/718 |
| 4,405,970 | 9/1983 | Swindal | 73/718 |
| 4,581,676 | 4/1986 | Baxter et al. | 73/718 |
| 4,683,754 | 8/1987 | Hirata et al. | 73/718 |
| 4,701,826 | 10/1987 | Mikkor | 361/283 |

OTHER PUBLICATIONS

U.S. Patent Application Ser. No. 07/226,915 filed Aug. 1, 1988.

Primary Examiner—Donald O. Woodiel
Attorney, Agent, or Firm—Finnegan, Henderson, Farabow, Garrett, and Dunner

[57] ABSTRACT

A pressure detector for measuring the pressure of a pressurized fluid by means of electrostatic capacitance comprising a diaphragm displaceable in response to the pressure, and a pair of fixed electrodes, one of each of the fixed electrodes being located on each side of the diaphragm and being electrostatically capacitively coupled to the diaphragm, each of the fixed electrodes being shaped to essentially eliminate electrostatic capacitances that are not differentially linear with respect to the pressure.

8 Claims, 6 Drawing Sheets

ELECTROSTATIC CAPACITANCE TYPE PRESSURE DETECTOR

BACKGROUND OF THE INVENTION

1. Field of the Invention

The present invention relates to a pressure detector of the single-diaphragm electrostatic capacitance type for measuring pressure on the basis of the electrostatic capacitance formed between a single diaphragm displaceable in response to pressure and each of fixed electrodes disposed at the opposite sides of the diaphragm, in which the influence of the electrostatic capacitance at a peripheral edge junction portion between the diaphragm and each of the fixed electrodes is eliminated so as to improve linearity in the detection signal. The present invention also relates to a pressure detector of the twin-diaphragm electrostatic capacitance type, in which the influence of the electrostatic capacitances at the respective peripheral edge portions between each of the diaphragms and the fixed electrodes associated thereto is eliminated so as to improve linearity in the detection signal.

2. Description of the Related Art

Such a pressure detector of the single-diaphragm electrostatic capacitance type for measuring pressure on the basis of the electrostatic capacitance formed between a single diaphragm displaceable in response to pressure and each of fixed electrodes disposed at the opposite sides of the diaphragm is disclosed, for example, in U.S. Pat. No. 2,999,386, entitled "HIGH PRECISION DIAPHRAGM TYPE INSTRUMENTS."

Figure 13:
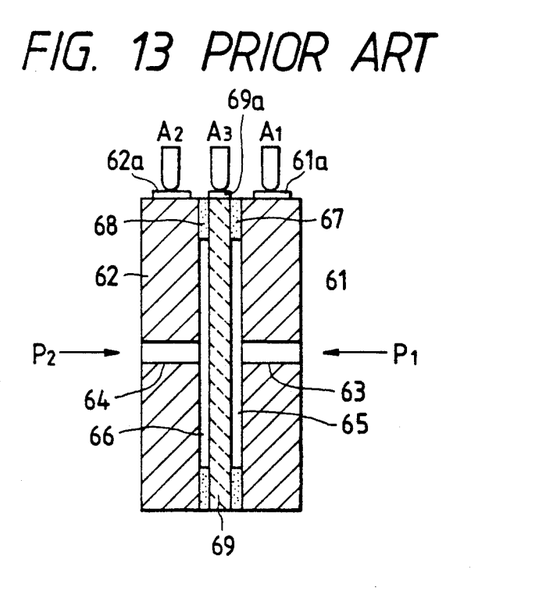
FIG. 13 is a sectional view of a main portion of a prior art example of the single-diaphragm electrostatic capacity type pressure detector.

FIG. 13 is a sectional view illustrating the configuration of a main portion of such a conventional single-diaphragm electrostatic capacitance type pressure detector. In FIG. 13, a diaphragm 69 of silicon has fixed electrodes 61 and 62 joined thereto through glass junction portions 67 and 68. An air gap 65 is formed between diaphragm 69 and fixed electrode 61, and an air gap 66 is formed between diaphragm 69 and fixed electrode 62. A pressure leading-in hole 63 is formed in fixed electrode 61 for leading pressure P1 into the air gap 65, and a pressure leading-in hole 64 is formed in the fixed electrode 62 for leading pressure P2 into the air gap 66.

A first capacitor consists of diaphragm 69 and fixed electrode 61, and the electrostatic capacitance C61 of this capacitor is taken out through lead pins A1 and A3. A second capacitor is constituted by the diaphragm 69 and fixed electrode 62, and the electrostatic capacitance C62 of this capacitor is taken out through lead pins A2 and A3. The reference numerals 61a, 62a and 69a represent electric conductor plates. When the pressures P1 and P2 act upon the diaphragm 69, the diaphragm is displaced corresponding to the differential pressure (P2−P1), and the electrostatic capacitances C61 and C62 vary corresponding to the displacement of diaphragm 69. It is possible to measure the differential pressure on the basis of this displacement.

Generally, the pressure detector shown in FIG. 13 is placed in a hermetically sealed housing with two seal diaphragms receiving the pressures P1 and P2, and an incompressible fluid for pressure transmission. For example, when silicone oil is enclosed in the housing, the air gaps 65 and 66 and the pressure leading-in holes 63 and 64 are filled with silicone oil.

In the conventional single-diaphragm type detector described above, two capacitors are actually formed between diaphragm 69 and fixed electrode 61. One capacitor is constituted by diaphragm 69 and fixed electrode 61 with the air gap 65 interposed in between. Its electrostatic capacitance is given by $Co/(1-\Delta/D)$, in which Co represents the electrostatic capacitance when the differential pressure (P2−P1) is zero, $\Delta$ represents the displacement of the diaphragm 69 in the right direction due to the differential pressure (P2−P1), and d represents the thickness of the air gap 65 when the differential pressure (P2−P1) is zero. It is generally assumed that P2 is greater than P1.

The other capacitor consists of diaphragm 69 and fixed electrode 61 with the glass junction 67 in between. Its electrostatic capacitance C67 is independent of the displacement of diaphragm 69, and thus has a harmful effect on the measurement.

Two capacitors are also formed between diaphragm 69 and fixed electrode 62. One capacitor is formed by the diaphragm 69 and fixed electrode 62 with the air gap 66 interposed in between, its electrostatic capacitance being given by $Co/(1+\Delta/d)$. The other capacitor is formed by diaphragm 69 and fixed electrode 61 with the glass junction portion 67 interposed in between, its electrostatic capacitance C68 is independent of the displacement of diaphragm 69 in the same manner as the electrostatic capacitance C67 and has a harmful effect on the measurement.

Figure 14:
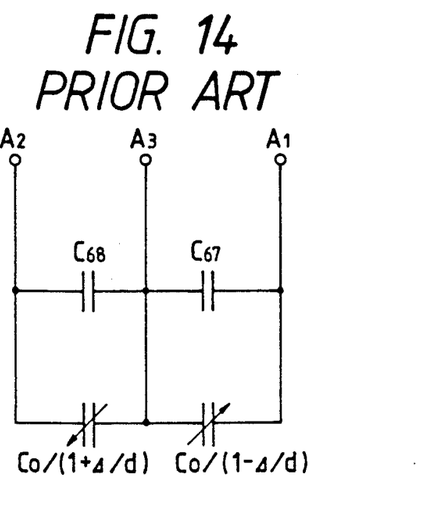
FIG. 14 is an equivalent circuit diagram of the electrostatic capacitances in the prior art example.

FIG. 14 is a schematic showing the electric circuit formed between lead pins $A_1$, $A_2$, and $A_3$. In FIG. 14, the electrostatic capacitance formed between lead pins A1 and A3 is expressed by $Co/(1-\Delta/d)+C67$, and the electrostatic capacitance formed between lead pins A2 and A3 is expressed by $Co/(1+\Delta/d)+C68$.

The electrostatic capacitances C67 and C68 have a harmful effect on the measurement, because they are typically similar in magnitude to Co. For example, let diaphragm 69 and fixed electrodes 61 and 62 each be 9-mm squares; let air gaps 65 and 66 be 7-mm circles filled with silicone oil; let the glass junctions 67 and 68 be made of SM-36A, a glass bonding material produced by the Nippon Electric Glass Company, Ltd.; let the thickness of air gaps 65 and 66, and glass junction 67 and 68 be 12-mm. The specific inductive capacitances of silicone oil and the glass bonding material SM-36A are 2.65 and 4.8, respectively. The permittivity constant is $8.85 \times 10^{-14}$ farads/cm. Then the electrostatic capacitance Co would be 75.21 pF, and C67 and C68 would both be 150.50 pF. Thus, the electrostatic capacitances C67 and C68, which have no relation to the measurement, are about twice as large as the electrostatic capacitance Co.

If the capacitances C67 and C68 were small enough to be negligible in comparison with the capacitance Co, the capacitances C10 and C20 given by $C10=Co/(1-\Delta/d)$ and $C20=Co/(1+\Delta/d)$, would vary differentially such that the signal F would be proportional to the diaphragm displacement $\Delta$, in accordance with the following equation:

$$F=(C10-C20)/(C10+C20)=\Delta/d$$

In the case of the example shown in FIG. 13, however, since each of the capacitances C67 and the C68 are about twice as large as the capacitance Co, the signal F is not expressed by the above equation. Higher order terms occur so that the signal F is no longer linear. One countermeasure uses extremely large electrode areas at the air gaps 65 and 66, in order to make capacitances C67 and C68 small in comparison with the capacitance Co. However, the size of such a pressure detector them becomes extremely large. Therefore, this countermeasure is not preferable.

A twin-diaphragm electrostatic capacitance type pressure detector is disclosed in U.S. Pat. No. 4,169,389 entitled "PRESSURE MEASURING DEVICE", the Assignee of which is Fuji Electric Co., Ltd.

Figure 15:
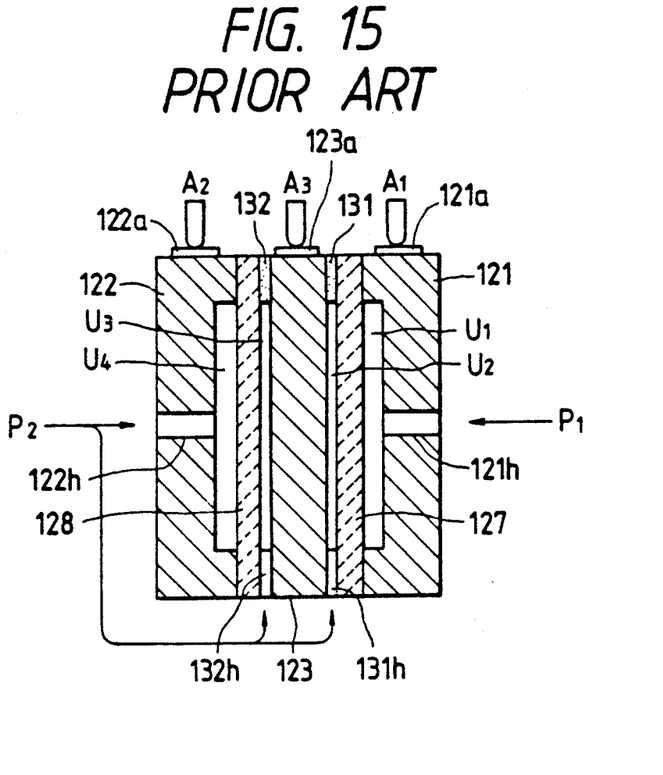
FIG. 15 is a sectional view of a main portion of a prior art example of the twin-diaphragm electrostatic capacitance type pressure detector.

FIG. 15 is a sectional view showing the main portion of a twin-diaphragm electrostatic capacitance type pressure detector. The detector comprises a center electrode 123, diaphragms 127 and 128, and fixed electrodes 121 and 122. Diaphragms 127 and 128 and fixed electrodes 121 and 122 are disposed on opposite sides of, and symmetrically with respect to, center electrode 123.

Center electrode 123 is provided with an electric conductor plate 123a at its outer periphery. Diaphragms 127 and 128 are joined to center electrode 123 by glass junctions 131 and 132. Hollow portions 131h and 132h are formed in glass junctions 131 and 132. Therefore, the gaps between diaphragms 127 and 128 and center electrode 123 are equal to the thicknesses of the glass junctions 131 and 132, respectively.

Fixed electrodes 121 and 122 are joined to the other sides of diaphragms 127 and 128. Air gaps provided between diaphragm 127 and fixed electrode 121, and between diaphragm 128 and fixed electrode 122. Pressure leading-in holes 121h and 122h are formed in fixed electrodes 121 and 122 so as to penetrate their center portions. Electric conductor plates 121a and 122a are provided on the outer peripheral surfaces of electrodes 121 and 122, respectively. Lead pins A1, A2, and A3 are in contact with the electric conductor plates 121a, 122a, and 123a and electrostatic capacitances are taken out through those lead pins.

Pressure P1 acts through pressure leading-in hole 121h of fixed electrode 121 onto a gap U1 on the right side of diaphragm 127. Pressure P2 acts through pressure leading-in hole 122h of fixed electrode 122 and the hollow portions 131h and 132h of glass junctions 131 and 132 onto a gap U2 between diaphragm 127 and center electrode 123, a gap U3 between center electrode 123 and diaphragm 128 and a gap U4 between diaphragm 128 and fixed electrode 122. The pressure difference (P2−P1) therefore does not displace diaphragm 128, while diaphragm 127 is displaced.

The pressure detector shown in FIG. 15 is generally placed within a hermetically sealed housing. Two seal diaphragms receive the pressures P1 and P2. Alternatively, the pressure detector may be placed within a hermetically sealed housing, with a single seal diaphragm, and an incompressible fluid for pressure transmission, such as silicone oil, enclosed in the housing.

The detector shown in FIG. 15 is of the twin-diaphragm type, and has the following features: (1) It can be used even when the media are different from each other. For example, when the gap U1 is filled with medium M and the gaps U2, U3 and U4 are filled with another medium N; (2) it is possible to easily restrain and compensate for the effect of a change in temperature.

Figure 16:
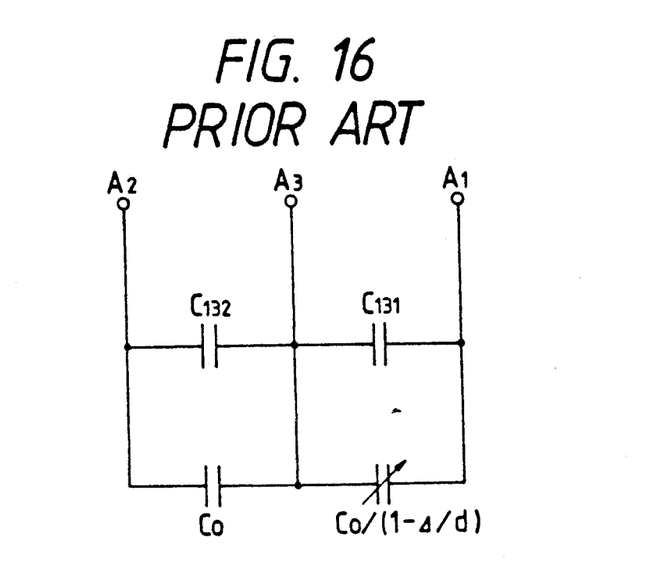
FIG. 16 is an equivalent circuit diagram of the electrostatic capacitances in the FIG. 15 prior art example.

FIG. 16 is an equivalent circuit diagram of the electrostatic capacitances in the twin-diaphragm type detector. The electrostatic capacitance between the fixed electrode 121 and the center electrode 123 in FIG. 15, which is taken out through the lead pins A1 and A3, is formed by the parallel connection of (1) an electrostatic capacitance $Co/(1-\Delta/d)$ formed between the center electrode 123 and the diaphragm 127, and (2) an electrostatic capacitance C131 formed through the respective peripheral portions of the fixed electrode 121, the diaphragm 127 and the center electrode 123.

In the above expression for the electrostatic capacitance $Co/(1-\Delta/d)$, d represents the gap between the right side of the center electrode 123 and the diaphragm 127 when the differential pressure (P2−P1) acting on the diaphragm 127 is zero. Co represents the electrostatic capacitance at that time, and C131 is the electrostatic capacitance across the thickness of the glass junction 131. It is assumed that the pressure P2 is larger than the pressure P1.

In the same manner, the electrostatic capacitance between the lead pins A2 and A3 is an electrostatic capacitance of a parallel connection of the electrostatic capacitance Co between the left side of the center electrode 123 and the diaphragm 128 and an electrostatic capacitance C132 across the thickness of the glass junction 132.

As has been described above, in the conventional twin-diaphragm type detector, since the capacitance C131 and the capacitance C132 are not so small as to be negligible in comparison with the capacitance Co, it is impossible to obtain a detection signal proportional to the displacement Δ of the diaphragm 127. The differential pressure (P1−P2) cannot be obtained from a signal given by F=(C10−C20), where C10 represents the composite electrostatic capacitance between the lead pins A1 and A3 and C20 represents the composite electrostatic capacitance between the lead pins A2 and A3.

SUMMARY OF THE INVENTION

It is therefore an object of the present invention to solve the foregoing problems in the conventional single-diaphragm electrostatic capacitance type pressure detector, and to provide an electrostatic capacitance type pressure detector in which the effect of the electrostatic capacitances in the peripheral junction portions between a diaphragm and fixed electrodes are essentially eliminated so as to improve linearity in the detection signal.

It is another object of the present invention to solve the foregoing problems in the conventional twin-diaphragm electrostatic capacitance type pressure detector, and to provide an electrostatic capacitance type pressure detector in which the effect of the electrostatic capacitances in peripheral edge junction portions between diaphragms and fixed electrodes are essentially eliminated so as to improve linearity in the detection signal.

In order to achieve the foregoing objects, according to a first aspect of the present invention, a single-diaphragm electrostatic capacitance type pressure detector for measuring pressure on the basis of an electrostatic capacitance formed between a diaphragm displaceable corresponding to the pressure and each of fixed electrodes comprises an electrode body having at its center portion a projection close and opposite to a surface of a center portion of the diaphragm, and having a hole for leading-in the pressure, and a support joined to a peripheral edge portion of the electrode body at the projection side so as to enclose the projection, and joined to a peripheral edge portion of the diaphragm at an end surface opposite to the joined portion to the electrode body, the support being made of an insulating material.

According to a second aspect of the present invention, a single-diaphragm electrostatic capacitance type pressure detector for measuring pressure on the basis of an electrostatic capacitance formed between a diaphragm displaceable corresponding to the pressure and each of fixed electrodes respectively disposed on opposite sides of the diaphragm, is arranged so that each of the fixed electrodes comprises a center electrode body having an end surface close and opposite to a surface of a center portion of the diaphragm, and having a hole for leading-in the pressure, an annular insulator joined to an outer peripheral surface of the center electrode body, an annular electric conductor joined to an outer peripheral surface of the annular insualtor, and insulatively joined at its one end surface to a peripheral edge portion of the diaphragm, and the diaphragm being electrically connected to the annular electric conductor of each of the fixed electrodes.

According to a third aspect of the present invention, a single-diaphragm electrostatic capacitance type pressure detector for measuring pressure on the basis of an electrostatic capacitance formed between a diaphragm displaceable corresponding to the pressure and each of fixed electrodes respectively disposed on opposite sides of the diaphragm and insulatively joined to the diaphragm at respective peripheral edge portions of the diaphragm and each of the fixed electrodes, is arranged so that a correcting capacitor having an electrostatic capacitance the temperature characteristic of which is the same as that at the peripheral edge joint portions between the diaphragm and each of the fixed electrodes so that effects of electrostatic capacitances at the peripheral edge joint portions between the diaphragm and each of the fixed electrodes are essentially eliminated.

In the single-diaphragm electrostatic capacitance type pressure detector according to the first aspect of the present invention, of the electrostatic capacitances formed between the diaphragm and the respective electrode bodies, each of the electrostatic capacitance formed through the peripheral edge portion of the diaphragm and the support and the electrostatic capacitance formed through an intermediate portion of the diaphragm can be made small enough to be negligible in comparison with the electrostatic capacitance formed through a center portion of the diaphragm so as to be made changeable differentially to thereby have linearity with respect to the pressure.

In the single-diaphragm electrostatic capacitance type pressure detector according to the second aspect of the present invention, of the electrostatic capacitances formed between the diaphragm of the center electrode bodies, the electrostatic capacitance formed through the peripheral edge portion of the diaphragm, the annular electric conductor and the annular insulator can be made small enough to be negligible in comparison with the electrostatic capacitance formed through a center portion of the diaphragm so as to be made changeable differentially to thereby have linearity with respect to the pressure.

In the single-diaphragm electrostatic capacitance type pressure detector according to the third aspect of the present invention, of the electrostatic capacitances formed between the diaphragm and the fixed electrodes, the electrostatic capacitance formed through the peripheral edge portion of the diaphragm can be eliminated by the electrostatic capacitance of the correcting capacitor, so that there exists only the electrostatic capacitance formed through a center portion of the diaphragm made changeable differentially to thereby provide the detection signal with linearity with respect to the pressure.

According to a fourth aspect of the present invention, an electrostatic capacitance type pressure detector comprises a center electrode, first and second diaphragm insulatively joined at junctions to the center electrode on its opposite sides respectively, and first and second fixed electrodes respectively electrically joined to the first and second diaphragm on opposite sides to the junctions respectively so as to form gaps between the first and second fixed electrodes and the first and second diaphragms, respectively, for measuring differential pressure between one pressure led in the gaps on the opposite sides of the second diaphragm and the center electrode side gap of the first diaphragm and the other pressure led in the gap between the first fixed electrode and the first diaphragm on the basis of an electrostatic capacitance formed between the center electrode and each of the first and second fixed electrodes, in which the center electrode includes an electrode substrate, insulating plates joined to the electrode substrate at opposite sides of the electrode substrate, and electric conductor plates joined to center portions of outer sides of the respective insulating plates and electrically connected to the electrode substrate.

In the twin-diaphragm electrostatic capacitance type pressure detector, of the electrostatic capacitances formed between the first and second fixed electrodes and the electrode substrate, the electrostatic capacitances formed through the electrode substrate, each insulating plate and the peripheral edge portion of each diaphragm and the electrostatic capacitances formed through the electrode substrate, each insulating plate and an intermediate portion of each diaphragm can be made small enough to be negligible in comparison with the electrostatic capacitances which are formed through the electrode substrate, each electric conductor plate and a center portion of each diaphragm so as to provide the detection signal with linearity with respect to the differential pressure.

BRIEF DESCRIPTION OF THE DRAWINGS

Other features and advantages of the present invention will be apparent from the following descriptions taken in connection with the accompanying drawings, wherein.

DETAILED DESCRIPTION OF THE PREFERRED EMBODIMENTS

Figure 1:
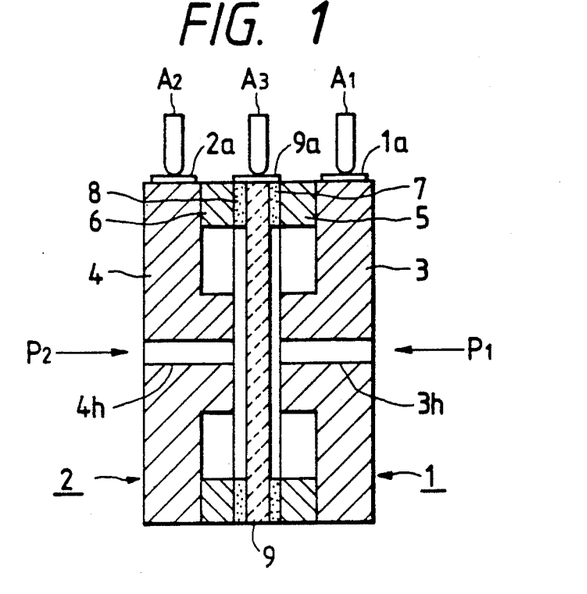
FIG. 1 is a sectional view showing a main portion of a first embodiment of the single-diaphragm electrostatic capacitance type pressure detector according to the present invention, for measuring pressure on the basis of electrostatic capacitances respectively formed between a diaphragm displaceable corresponding to the pressure and fixed electrodes disposed at the opposite sides of the diaphragm.

Embodiments of the electrostatic capacitance type pressure detector according to the present invention will be described with reference to the drawings. FIG. 1 is a sectional view of a main portion of a first embodiment of the single-diaphragm electrostatic capacitance type pressure detector according to the present invention, in which a detection portion comprises a diaphragm 9, and fixed electrodes 1 and 2 symmetrically placed on opposite sides of the diaphragm 9. The fixed electrodes 1 and 2 mainly comprise electrode bodies 3 and 4, and respective supports 5 and 6. Only the side of the fixed electrode 1 will be described, as it also represents the side of the fixed electrode 2, unless a difference is specifically noted. Any difference will be specifically pointed out.

The electrode body 3 is a thick plate-like member having a projection at a center portion thereof. The electrode body 3 is provided with a pressure leading-in hole 3h formed so as to penetrate the center portion thereof and an electric conductor plate 1a disposed at the outer peripheral surface thereof. The support 5 is an annular member made of an insulating material, and is joined to a peripheral edge portion of the electrode body 3 on an end surface thereof while enclosing the abovementioned projection. The surface of the projection of the electrode body 3 and the free end surface of the support 5 are on the same plane. The fixed electrode 1 is joined to the right side surface of the diaphragm 9 through a glass junction portion 7. Therefore, the gap formed between the right side surface of the diaphragm 9 and the surface of the projection of the electrode body 3 is equal to the thickness of the glass junction portion 7. Pressure P1 acts on the right side gap of the diaphragm 9. An electric conductor plate 9a is provided on the other peripheral surface of the diaphragm 9. Lead pins A1 and A3 are in contact with electric conductor plates 1a and 9a, respectively, so that an electrostatic capacitance formed between the fixed electrode 1 and the diaphragm 9 is taken out through the lead pins A1 and A3 as will be described later. The reference numerals 8, 2a and A2 represent a glass junction, an electric conductor plate, and a lead pin, respectively, concerned with the other fixed electrode 2.

Figure 2:
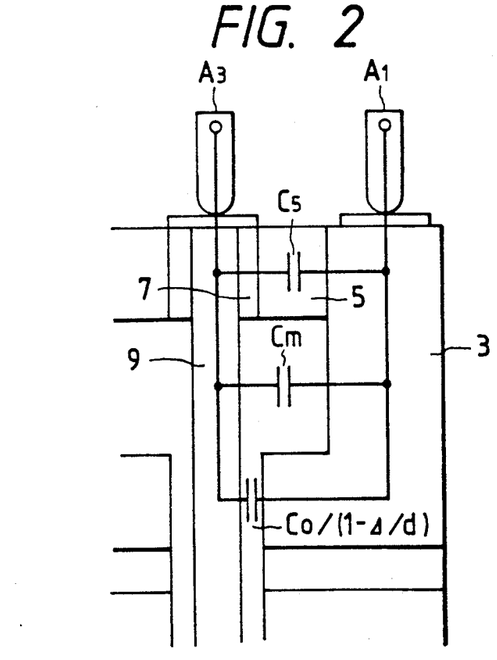
FIG. 2 is a diagram schematically illustrating the electrostatic capacitances formed in the first embodiment shown in FIG. 1.

FIG. 2 is a diagram schematically illustrating electrostatic capacitance formed on the fixed electrode 1 side in the first embodiment shown in FIG. 1. The electrostatic capacitance formed between the fixed electrode 1 and the diaphragm 9, that is, the electrostatic capacitance taken out through the lead pins A1 and A3 is an electrostatic capacitance of a parallel connection of (1) an electrostatic capacitance $Co/(1-\Delta/d)$ formed through a gap between the surface of the projection of the electrode body 3 and the diaphragm 9 opposite to the former, (2) an electrostatic capacitance Cm formed through a gap between the surface of an intermediate surface of the electrode body 3 and the diaphragm 9 opposite to the former, and (3) an electrostatic capacitance C5 of the support 5, in which d represents a gap between the surface of the projection of the electrode body 3 and the diaphragm 9 opposite to the former when the differential pressure (P2−P1) acting on the diaphragm 9 is zero, Co represents an electrostatic capacitance at that time, and C5 represents the electrostatic capacitance formed in the thickness direction of the support 5. The electrostatic capacitance at glass junction 7 is eliminated by providing the conductor plate 9a to cover glass junction 7. P2 is a pressure acting on the left side of the diaphragm 9 and it is assumed that the pressure P2 is larger than the pressure P1.

Figure 3:
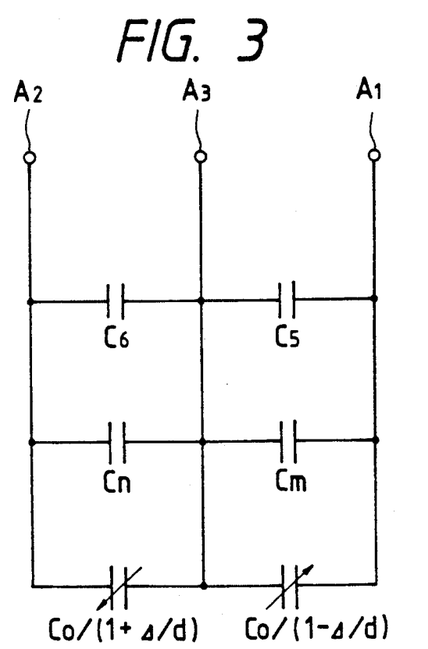
FIG. 3 is an equivalent circuit diagram of the electrostatic capacitances in the first embodiment.

FIG. 3 is an equivalent circuit diagram of the electrostatic capacitances in the first embodiment. In FIG. 3, it is assumed that electrostatic capacitances C6 and Cn correspond to the electrostatic capacitances C5 and Cm, respectively, and have the same values. Now, if the values of the electrostatic capacitances C5, C6, Cm, and Cn are selected to be sufficiently small in comparison with that of the electrostatic capacitance Co, the respective electrostatic capacitances C1 and C2 between the lead pins A1 and A3 and between the lead pins A2 and A3 are expressed approximately as follows.

$C1 = Co/(1-\Delta/d)$ $C2 = Co/(1+\Delta/d)$

For example, if the outer diameter of the projection of the electrode body 3 is selected to be 5.8 mm, and each of the supports 5 and 6 have an inner diameter of 6.7 mm and a thickness of 2 mm and are formed of ceramic material that has a specific inductive capacitance of 5.8, the respective electrostatic capacitances of C5, C6, Cm, Cn, and Co are C5=C6=1.18 pF, Cm=Cn=0.103 pF, and Co=51.6 pF. The plus sign in the denominator of the equation for C2 means that the diaphragm 9 is displaced in the direction away from the surface of the projection of the electrode body 4.

Therefore, as has been described with respect to the example above, it is possible to obtain a detection signal proportional to the differential pressure (P2−P1).

Figure 4:
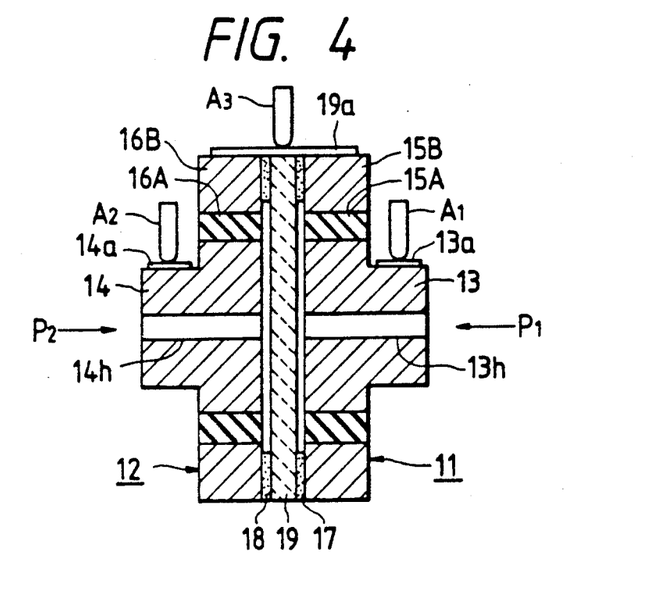
FIG. 4 is a sectional view of a main portion of a second embodiment of the single-diaphragm type detector according to the present invention.

Next, a second embodiment of the electrostatic capacitance type pressure detector according to the present invention will be described with reference to the drawings. FIG. 4 is a sectional view of a main portion of the second embodiment of the single-diaphragm type detector, in which the detection portion comprises a diaphragm 19, and fixed electrodes 11 and 12 at opposite sides of the symmetrically placed diaphragm 19. The fixed electrodes 11 and 12 consist mainly of center electrode bodies 13 and 14, annular insulators 15A and 16A, and annular electric conductors 15B and 16B, respectively. Only the fixed electrode 11 side will be described, as it also represents the fixed electrode 12 side. Any differences will be specifically pointed out.

The center electrode body 13 is a two-step column-like body having two diameters, provided with a pressure leading-in hole 13h penetrating its center portion. The inner peripheral surface of the annular insulator 15A is joined to the outer peripheral surface of the large diameter portion of the center electrode body 13. The inner peripheral surface of the annular electric conductor 15B is joined to the outer peripheral surface of the annular insulator 15A. An electric conductor plate 13a is provided in the outer peripheral surface of the small diameter portion of the center electrode body 13. The respective left end surfaces of the center electrode body 13, the annular insulator 15A, and the annular electric conductor 15B are on the same plane. The fixed electrode 11 is joined to the right side surface of the diaphragm 19 through glass junction 17. Therefore, the gap between the right side surface of the diaphragm 19 and the left side surface of the center electrode body 13 is equal to the thickness of glass junction 17.

Pressure P1 acts on the gap at the right side of the diaphragm 19. An electric conductor plate 19a is provided so as to connect the outer peripheral surface of diaphragm 19 to annular electric conductors 15B and 16B. Lead pins A1 and A3 are in contact with the electric conductor plates 13a and 19a, respectively. The electrostatic capacitance formed between fixed electrode 11 and diaphragm 19 is taken out through lead pins A1 and A3 as will be described later. The reference numerals 18, 14a and A2 represent a glass junction, an electric conductor plate and a lead pin, used with the other fixed electrode 12.

Figure 5:
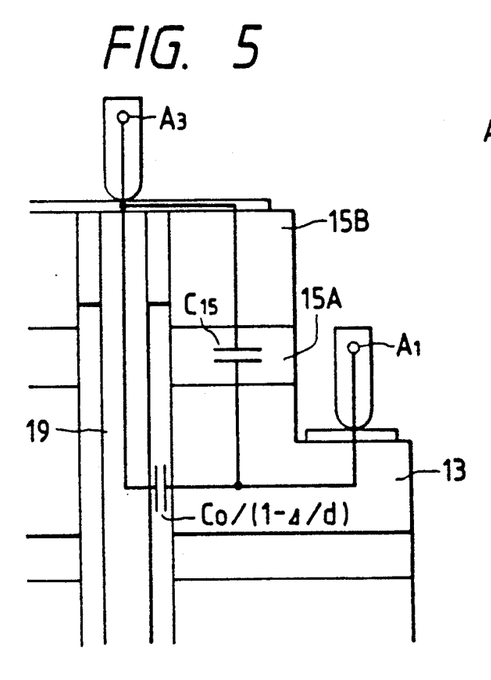
FIG. 5 is a diagram schematically illustrating the electrostatic capacitances formed in the second embodiment shown in FIG. 4.

FIG. 5 is a diagram schematically illustrating the electrostatic capacitances formed on the fixed electrode 11 side in the second embodiment. The electrostatic capacitance formed between the fixed electrode 11 and the diaphragm 19, that is taken out through the lead pins A1 and A3, is an electrostatic capacitance of a parallel connection of (1) an electrostatic capacitance $C_o/(1-\Delta/d)$ formed across a gap between the left end surface of center electrode body 13 and diaphragm 19 opposite to the electrode body, (2) an electrostatic capacitance C15 formed by center electrode body 13, annular insulator 15A and annular electric conductor 15B. C15 represents the electrostatic capacitance across the diameter of the annular insulator 15A. The parts similar to those in the first embodiment are referenced correspondingly.

Figure 6:
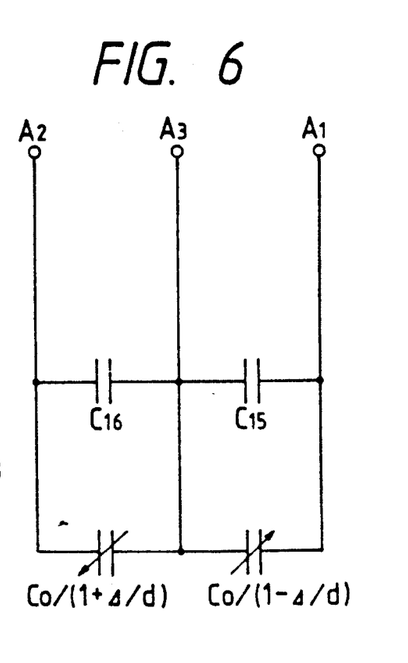
FIG. 6 is an equivalent circuit diagram of the electrostatic capacitances in the second embodiment.

FIG. 6 is an equivalent circuit diagram of the electrostatic capacitances in the second embodiment. In FIG. 5, C16 represents an electrostatic capacitance which corresponds to the electrostatic capacitance C15 and which has the same value. Now, if the values of the electrostatic capacitances C15 and C16 are selected to be much smaller than that of the electrostatic capacitance Co, the respective electrostatic capacitances C11 and C12 between the lead pins A1 and A3 and between the lead pins A2 and A3 are expressed approximately as follows.

$$C_{11} = C_o/(1-\Delta/d)$$

$$C_{12} = C_o/(1+\Delta/d)$$

The plus sign in the denominator of the equation for the electrostatic capacitance C12 means that the diaphragm 19 displaces in the direction away from the left side surface of the center electrode body 14. Therefore, it is possible to obtain a detection signal proportional to the differential pressure (P2−P1).

Figure 7:
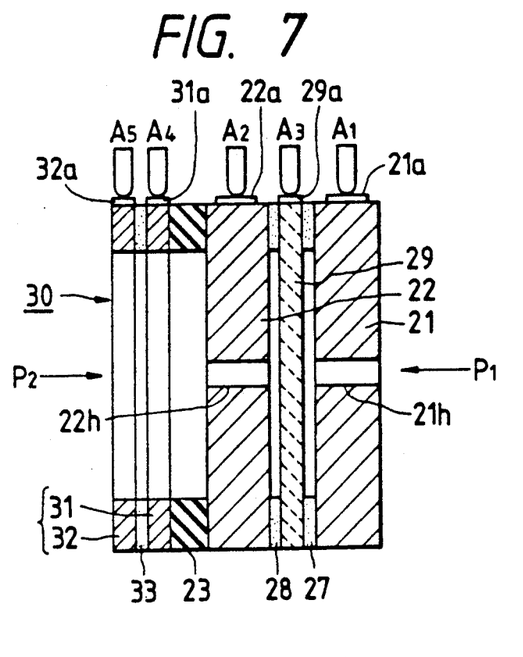
FIG. 7 is a sectional view of a main portion of a third embodiment of the single-diaphragm type detector according to the present invention.

Next, a third embodiment of the single-diaphragm electrostatic capacitance type pressure detector according to the present invention will be described with reference to the drawings. FIG. 7 is a sectional view of a main portion of the third embodiment, in which the detection portion comprises a detection body and a correcting capacitor 30. The detection body comprises a diaphragm 29 and fixed electrodes 21 and 22 joined to the opposite sides of the diaphragm through glass junctions 27 and 28. The correcting capacitor 30 comprises annular electrodes 31 and 32 between which an annular glass junction 33 is inserted. The correcting capacitor 30 also includes the capacitance formed by fixed electrode 22 and electrode 31 across annular insulator 23. Fixed electrodes 21 and 22 are provided with pressure leading-in holes 21h and 22h penetrating their center portions, and are provided with electric conductor plates 21a and 22a on the outer peripheral surface thereof respectively. Electric conductor plates 31a and 32a are provided on the outer peripheral surfaces of the electrodes 31 and 32 of the correcting capacitor 30 respectively.

The gap between the right surface of diaphragm 29 and the left surface of fixed electrode 21 is equal to the thickness of glass junction 27. The gap between the left surface of the diaphragm 29 and the right surface of fixed electrode 22 is equal to the thickness of the glass junction 28. The thicknesses of glass junctions 27 and 29 are equal to each other in this embodiment.

Pressures P1 and P2 act on the gaps on the right and left sides of the diaphragm 29, respectively. Electric conductor plate 29a is provided on the outer peripheral surface of the diaphragm 29. Lead pin A1 is in contact with the electric conductor plate 21a, and lead pins A2 and A3 are in contact with electric conductor plates 22a and 29a, respectively. Electrostatic capacitances C21 and C22 are formed between fixed electrode 21 and diaphragm 29, and between fixed electrode 22 and diaphragm 29, respectively. They are taken out through lead pins A1 and A3, and lead pins A2 and A3, respectively. Lead pins A4 and A5 are in contact with electric conductor plate 31a and electric conductor plate 32a, respectively. The electrostatic capacitance C30 formed between electrodes 31 and 32 is taken out through lead pins A4 and A5.

Figure 8:
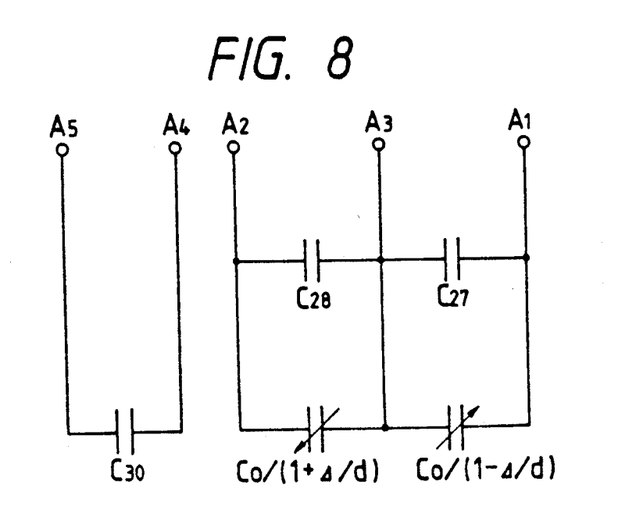
FIG. 8 is an equivalent circuit diagram of the electrostatic capacitances in the third embodiment shown in FIG. 7.

FIG. 8 is an equivalent circuit diagram of the electrostatic capacitances in the third embodiment. In FIG. 8, C27 and C28 are electrostatic capacitances formed across glass junctions 27 and 28, and have the same value. If the electrostatic capacitance of the correcting capacitor 30 is C30, the electrostatic capacitances C30, C27 and C28 are selected so that:

$$C_{30} = 2 \cdot C_{27} = 2 \cdot C_{28}$$

and the electrostatic capacitance of the annular insulator 23 is selected to be very small. Since the electrostatic capacitances C30, C27 and C28 are all across glass junctions, their termperature characteristics can be made identical. The parts similar to those in the first and second embodiments are referenced correspondingly.

The electrostatic capacitances C27 and C28 are too large to be ignored in comparison with the electrostatic capacitance Co. Therefore, the correcting capacitor 30 is used to obtain a proportional detection signal.

Figure 9:
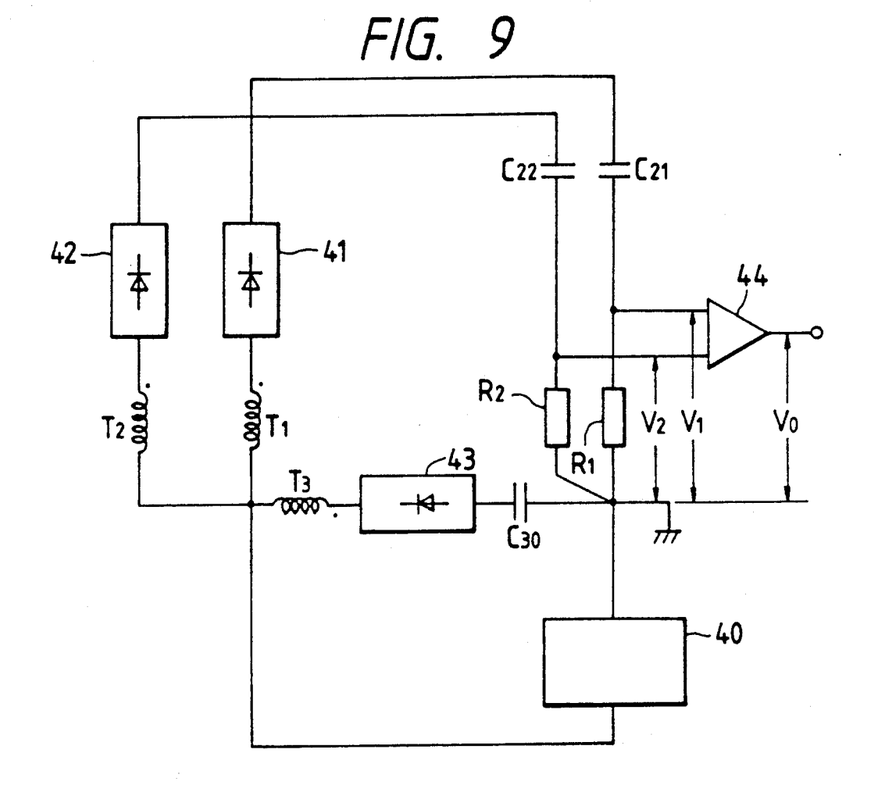
FIG. 9 is a diagram of a detection circuit used in the third embodiment.

FIG. 9 is a diagram of a detection circuit for obtaining a detection signal proportional to the differential pressure in the third embodiment. The detection circuit includes a constant-current circuit 40, rectifiers 41, 42, and 43 a differential amplifier 44, transformers T1, T2, and T3, and resistors R1 and R2 for extracting DC voltage. While transformers T1 and T2 have the same phase, transformer T3 has the opposite phase.

The series connection of resistor R1, electrostatic capacitance C21, rectifier 41 and transformer T1; the series connection of resistor R2, electrostatic capacitance C22, rectifier 42 and transformer T2; and the series connection of electrostatic capacitance C30, rectifier 43 and transformer T3 are all connected in parallel. A constant current is supplied from the constant-current circuit 40 to this parallel circuit, and voltages V1 and V2 are inputted to differential amplifier 44. The output Vo of the differential amplifier 44 is the desired detection signal.

Assuming that the currents flowing across the electrostatic capacitances C21, C22, and C30 are represented by J1, J2, and J3, respectively, the AC voltage and frequency obtained from each transformer are E and f, and $R = R1 = R2$, the currents J1, J2, and J3 are expressed as follows:

$$J1 = f \cdot C21 \cdot E$$

$$J2 = f \cdot C22 \cdot E$$

$$J3 = f \cdot C30 \cdot E$$

Therefore, if k is a constant, the output voltage Vo is expressed as follows:

$$Vo = k(V1 - V2) = kfR \cdot E(C21 - C22) \quad (1)$$

The constant current Jo from the constant-current circuit 40 is expressed as follows.

$$Jo = J1 + J2 - J3 = fE(C21 + C22 - C30) \quad (2)$$

Since Jo is a constant current, we can eliminate f from equations (1) and (2), and obtain the voltage Vo as follows:

$$Vo = c(C21 - C22)/(C21 + C22 - C30) \quad (3)$$

where $c = kRJo$. Then, since the equations $$C21 = C27 + Co/(1 - \Delta/d)$$

$$C22 = C28 + Co/(1 + \Delta/d)$$

$$C30 = 2 \cdot C27 = 2 \cdot C28$$

are established, the output voltage Vo is expressed as follows:

$$Vo = c\Delta/d \quad (4)$$

Therefore, the output voltage Vo is not affected by the electrostatic capacitances C27 and C28. The electrostatic capacitances C30, C27 and C28 are physically close to each other, so that they are at the same temperature, even if the surrounding temperature thereof changes. Thus, the relation:

$$C30 = 2 \cdot C27 = 2 \cdot C28$$

holds even in a variable temperature environment. Thus, the detection signal is linear with respect to the displacement of diaphragm 29, and the differential pressure (P2−P1), even when the surrounding temperature changes.

Figure 10:
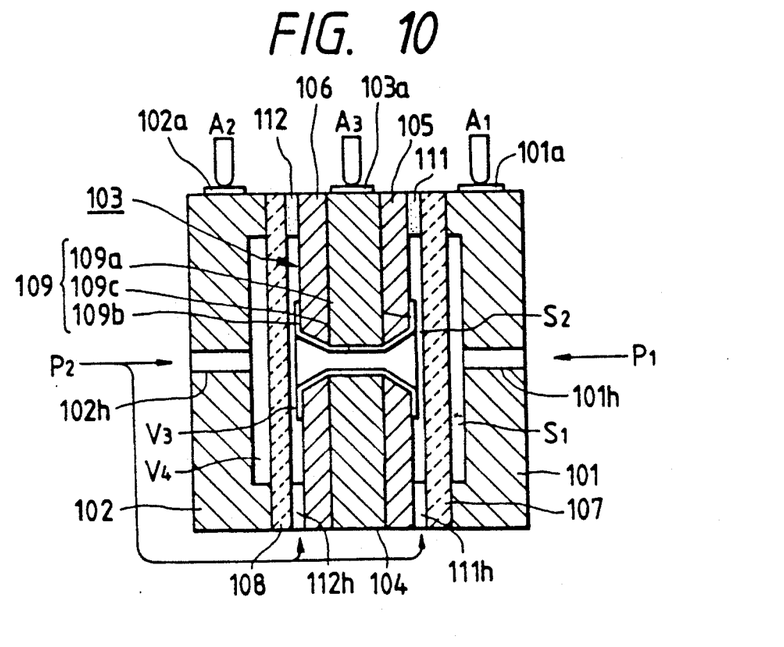
FIG. 10 is a sectional view showing a main portion of an embodiment of the twin-diaphragm electrostatic capacitance type pressure detector according to the present invention, having two diaphragms provided in the opposite sides of a center electrode respectively.

An embodiment of the twin-diaphragm electrostatic capacitance type pressure detector according to the present invention will be described next. FIG. 10 is a sectional view of a main portion of this embodiment, where the detection portion comprises center electrode 103, diaphragms 107 and 108, and fixed electrodes 101 and 102. Electrodes 101 and 102 are disposed on the opposite sides of, and symmetrically with respect to the center electrode 103, respectively.

The center electrode 103 comprises an electrode substrate 104, insulating plates 105 and 106 joined to the opposite sides of substrate 104, and a conducting portion 109. This conducting portion 109 is a member integrally formed by a center conducting pipe 109c and conducting plates 109a and 109b disposed on opposite sides of the center conducting pipe 109c. The conducting portion 109 is provided to penetrate the electrode substrate 104 and the insulating plates 105 and 106 at their center so that the conducting plates 109a and 109b are exposed at the respective surfaces of the insulating plates 105 and 106. An electric conductor plate 103a is provided at the outer periphery of electrode substrate 104. Diaphragms 107 and 108 are joined at their peripheral edge portions to the sides of the insulating plates 105 and 106 through glass junctions 111 and 112, respectively. Glass junctions 111 and 112 have hollow portions 111h and 112h, respectively.

The other sides of diaphragms 107 and 108 are electrically joined to fixed electrodes 101 and 102 having recessed portions on one of their sides, and gaps S1 and S2 corresponding to those recesses between diaphragm 107 and fixed electrode 101 and between the diaphragm 108 and the fixed electrode 102. In fixed electrodes 101 and 102, pressure leading-in holes 101h and 102h are formed in their centers, and electric conductor plates 101a and 102a are provided on their outer peripheral surfaces. Lead pins A1, A2, and A3 are in contact with electric conductor plates 101a, 102a, and 103a. Electrostatic capacitances are taken out through lead pins A1, A2, and A3.

Pressure P1 acts on a gap S1 formed on the right side of diaphragm 107 through pressure leading-in hole 101h. Pressure P2 acts on gap S2 formed between diaphragm 107 and center electrode 103, gap V3 formed between center electrode 103 and diaphragm 108 and gap V4 formed between diaphragm 108 and fixed electrode 102 through pressure leading-in hole 102h of fixed electrode 102 and hollow portions 111h and 112h of the glass junctions 111 and 112. Thus, diaphragm 108 is not displaced, even though diaghragm 107 is.

Figure 11:
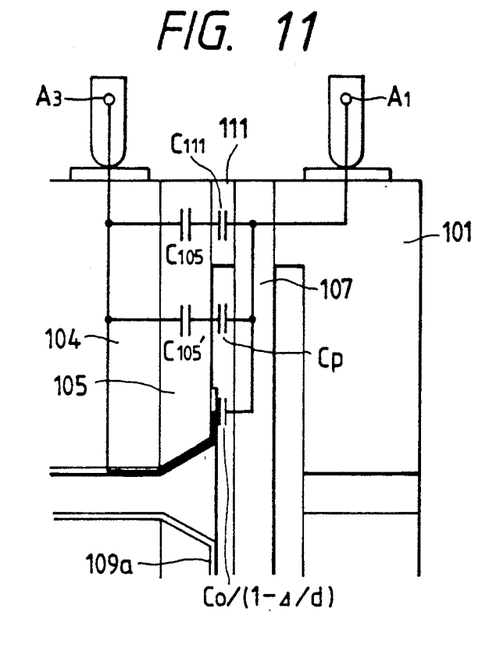
FIG. 11 is a diagram schematically illustrating the electrostatic capacitances formed in the FIG. 10 embodiments.

FIG. 11 is a diagram schematically illustrating electrostatic capacitance formed on the fixed electrode 101 side in this embodiment. The electrostatic capacitance formed between fixed electrode 101 and center electrode 103 is taken out through lead pins A1 and A3. It is the capacitance of a parallel connection (1) the electrostatic capacitance $Co/(1 - \Delta/d)$ formed across the gap between the center portion of the left surface of the diaphragm 107 and conducting portion 109a opposite to it, (2) the electrostatic capacitance formed across the gap between the left surface of an intermediate portion of diaphragm 107 and insulating plate 105 opposite to it, i.e., the series connection of the capacitances Cp and C105', and (3) an electrostatic capacitance formed across the glass junction 111 and insulator 105, i.e., the series connection of the capacitances C111 and C105.

In FIG. 11, d represents the gap between diaphragm 107 and conducting portion 109a opposite to it when the differential pressure (P2−P1) acting on diaphragm 107 is zero, Co represents the electrostatic capacitance when P1=P2, Cp represents the electrostatic capacitance formed between the left surface of the intermediate portion of diaphragm 107 and the surface of insulating plate 105, C105' represents the electrostatic capacitance across the thickness of insulating plate 105, C111 represents the electrostatic capacitance across the thickness of glass junction 111, and C105 represents the electrostatic capacitance across the thickness of insulating plate 105 opposite to glass junction 111. P2 is the pressure acting on the left side of diaphragm 108, and it is assumed that pressure P2 is larger than pressure P1.

Figure 12:
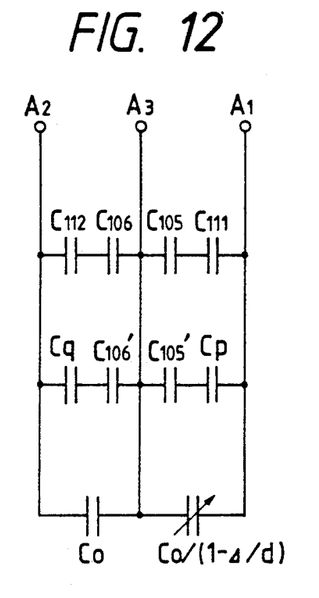
FIG. 12 is an equivalent circuit diagram of the electrostatic capacitances in the FIG. 10 embodiment.

FIG. 12 is an equivalent circuit diagram of the electrostatic capacitances in this embodiment, which has the same components as FIG. 11. In FIG. 12, Co represents the fixed constant electrostatic capacitance between diaphragm 108 and conducting portion 109b, Cq represents the electrostatic capacitance formed between the left side surface of an intermediate portion of diaphragm 108 and the surface of insulating plate 106, C106' represents the electrostatic capacitance across the thickness of insulating plate 106, C112 represents the electrostatic capacitance across the thickness of glass junction 112, and C106 represents the electrostatic capacitance across the thickness of insulating plate 106 opposite glass junction 112.

Now, if the values of the electrostatic capacitances C105, C105', C106 and C106' are selected to be much smaller than those of the electrostatic capcitances C111, C112, Cp and Cq, electrostatic capacitances C1 and C2 between lead pins A1 and A3 and between lead pins A2 and A3, respectively, are expressed approximately as follows:

$$C1 = Co/(1 - \Delta/d)$$

$$C2 = Co.$$

For example, if the inner diameter and thickness of each of the glass junctions 111 and 112 are selected to be 6.7 mm and 12 μm, respectively, and each of the insulator plates 105 and 106 having a thickness of 2 mm is formed of a ceramic material having a specific inductive capacitance of 5.8, and the outer diameter of each of conducting plates 109a and 109b is selected to be 5.8 mm, the respective electrostatic capacitances of C111, C112, C105, C106, C105', C106', Cp, Cq, and Co are C111=C112=195.7 pF, C105=C106=1.18 pF, C105'=C106'=0.2268 pF, Cp=Cq=17.268 pF, and Co=51.6 pF. Accordingly, the composite value $C_{G1}$ of C111 and C112 becomes $C_{G1}=1.173$ pF, the composite value $C_{G2}$ of C105' and Cp becomes $C_{G2}=0.224$ pF, and the composite value of the stray capacitances with respect to Co becomes $C_{G1}+G_{G2}\approx 1.4$ pF so that the composite value of the stray capacitances becomes small enough to be negligible. Therefore, it is possible by using circuits to obtain a signal F, given by F=(C1−C2)/C1, proportional to the displacement Δ of the diaphragm 107, i.e., the differential pressure (P1−p2).

The electrostatic capacitances formed through the electrode substrate, insulating plates and peripheral edge portions of diaphragms and the electrostatic capacitances formed across the electrode substrate, the insulating plates and intermediate portions of the diaphragms can be made small enough to be negligible in comparison with the main electrostatic capacitance which is linear with respect to the differential pressure between center portions of the diaphrams.

The distinctive advantages of the present invention are as follows:

(1) In the single-diaphragm type detector, by eliminating the effects of the electrostatic capacitance in the peripheral junction portions between the diaphragm and the fixed electrodes, it is possible to greatly improve linearity of the detection signal.

(2) In the single-diaphragm type detector according to the third aspect of the present invention, by using a correcting capacitor in addition to a conventional detecting capacitor, it is possible to easily improve linearity of the detection signal.

(3) In the twin-diaphragm type detector, by eliminating the influence of the electrostatic capacitances at the peripheral junction portions between the diaphragms and the fixed electrodes, it is possible to greatly improve linearity in the detection signal.

(4) In the electrostatic capacitance type pressure detectors, both of the single-diaphragm type and of the twin-diaphragm type, it is easy to produce the detectors because of their simple construction, and it is possible to improve their reliability.

What is claimed is:

1. A pressure detector for measuring the pressure of a pressurized fluid by means of electrostatic capacitances comprising:
   a diaphragm displaceable in response to the pressure; and
   a pair of fixed electrodes, one of each of said fixed electrodes being located on each side of said diaphragm and being electrostatically capacitively coupled to said diaphragm, each of said fixed electrodes being shaped to essentially eliminate electrostatic capacitances that are not differentially linear with respect to the pressure.

2. A pressure detector according to claim 1, wherein each of the fixed electrodes includes a first portion close to and opposite a surface of the diaphragm and a second portion supported by an insulating material to provide a gap between said second portion and the surface of the diaphragm.

3. A pressure detector according to claim 2, wherein each of said fixed electrodes contains a hole for receiving the pressurized fluid.

4. An electrostatic capacitance type pressure detector for measuring the pressure of a pressurized fluid by means of the electrostatic capacitance formed between a diaphragm having a center portion and being displaceable in response to the pressure and a pair of fixed electrodes separately disposed on opposite sides of the diaphragm, wherein each of the fixed electrodes comprises:
   an electrode body having at a center portion of a side thereof a projection extending toward and close to the surface of the center portion of the diaphragm, and having a hole for receiving the fluid under pressure; and a support joined to a peripheral edge portion of said electrode body of the side of the body to enclose said projection, said support also being joined to a peripheral edge portion of the diaphragm at an end surface opposite to the joined portion of said electrode body, said support being made of an insulating material.

5. An electrostatic capacitance type pressure detector for measuring the pressure of a pressurized fluid by means of the electrostatic capacitance formed between a diaphragm having a center portion and being displaceable in response to the pressure and a pair of fixed electrodes separately disposed on opposite sides of the diaphragm, wherein each of the fixed electrodes comprises:

a center electrode body having an end surface close to and opposite the surface of the center portion of the diaphragm, and having a hole for receiving the pressurized fluid;

an annular insulator joined to an outer peripheral surface of said center electrode body; and an annular electrical conductor joined to an outer peripheral surface of said annular insulator, and insulatively joined at an end surface to a peripheral edge portion of the diaphragm, the diaphragm being electrically connected to said annular electrical conductor at each of said fixed electrodes.

6. A pressure detector for measuring the pressure of a pressurized fluid by means of electrostatic capacitance comprising:

a diaphragm displaceable in response to the pressure; and a pair of fixed electrodes separately disposed on each side of said diaphragm and being electrostatically capacitively coupled to said diaphragm said pair of electrodes being shaped to provide corrective capacitance for eliminating capacitances that are not differentially linear with respect to the pressure.

7. A pressure detector for measuring the pressure of a pressurized fluid by means of electrostatic capacitance comprising:

a diaphragm displaceable in response to the pressure;

a pair of fixed electrodes separately disposed on each side of said diaphragm and being electrostatically capacitively coupled to said diaphragm, each of said fixed electrodes being insulatively joined to said diaphragm at a peripheral edge joint; and corrective capacitance means for eliminating electrostatic capacitances that are not differentially linear with respect to the pressure, said corrective capacitance means having a temperature characteristic that is the same as that at said peripheral edge joint between said diaphragm and each of said fixed electrodes.

8. An electrostatic capacitance type pressure detector comprising:

a center electrode;

first and second diaphragms insulatively joined at junctions to said center elecrode at opposite sides thereof; and first and second fixed electrodes electrically joined to said first and second diaphragms at opposite sides to said junctions to form gaps between said first and second fixed electrodes and said first and second diaphragms, for measuring the differential pressure between one pressure existing in the gaps on one side of said second diaphragm and another pressure existing in the gap between said first fixed electrode and said first diaphragm on the basis of an electrostatic capacitance formed between said center electrode and each of said first and second fixed electrodes, in which said center electrode comprises an electrode substrate, insultating plates joined to said electrode substrate at opposite sides of said electrode substrate, and conductor plates joined to center portions of outer sides of said insulating plates and electrically connected to said electrode substrate.

* * * * *